Figure 2:
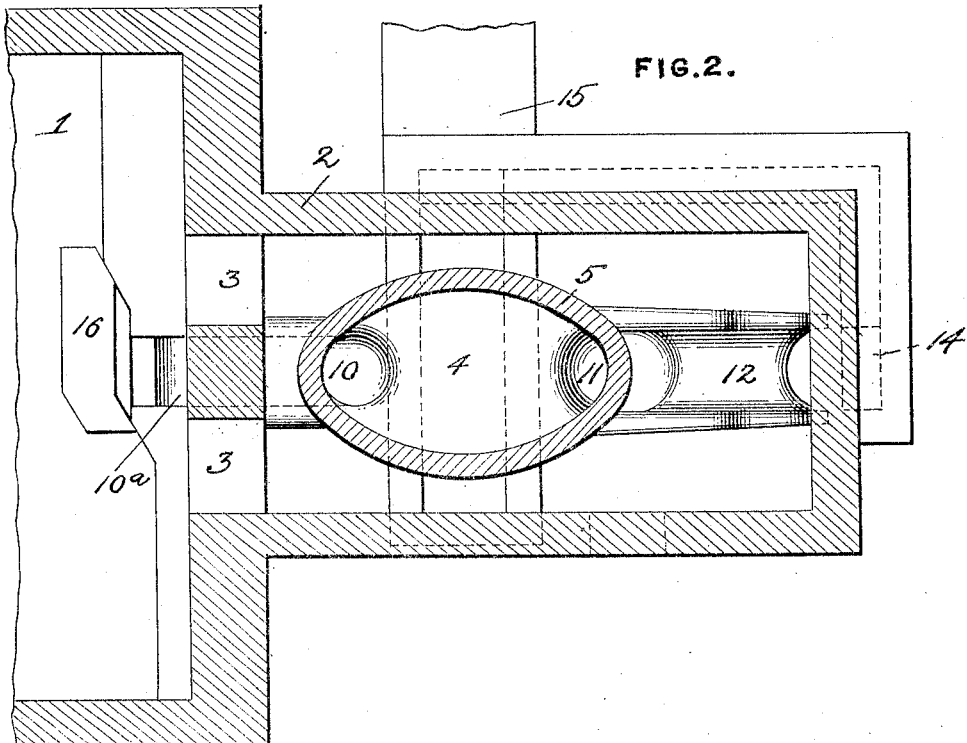

H. K. HITCHCOCK.
APPARATUS FOR THE MANUFACTURE OF PLATE GLASS.
APPLICATION FILED SEPT. 26, 1913. RENEWED FEB. 4, 1918.

1,307,357.

Patented June 24, 1919.
5 SHEETS—SHEET 1.

WITNESSES:
Paul M. Critchlow
Francis J. Tomasson

INVENTOR
Halbert K. Hitchcock
by Christy & Christy
Atty's

H. K. HITCHCOCK.
APPARATUS FOR THE MANUFACTURE OF PLATE GLASS.
APPLICATION FILED SEPT. 26, 1913. RENEWED FEB. 4, 1918.
1,307,357.
Patented June 24, 1919.
5 SHEETS—SHEET 2.
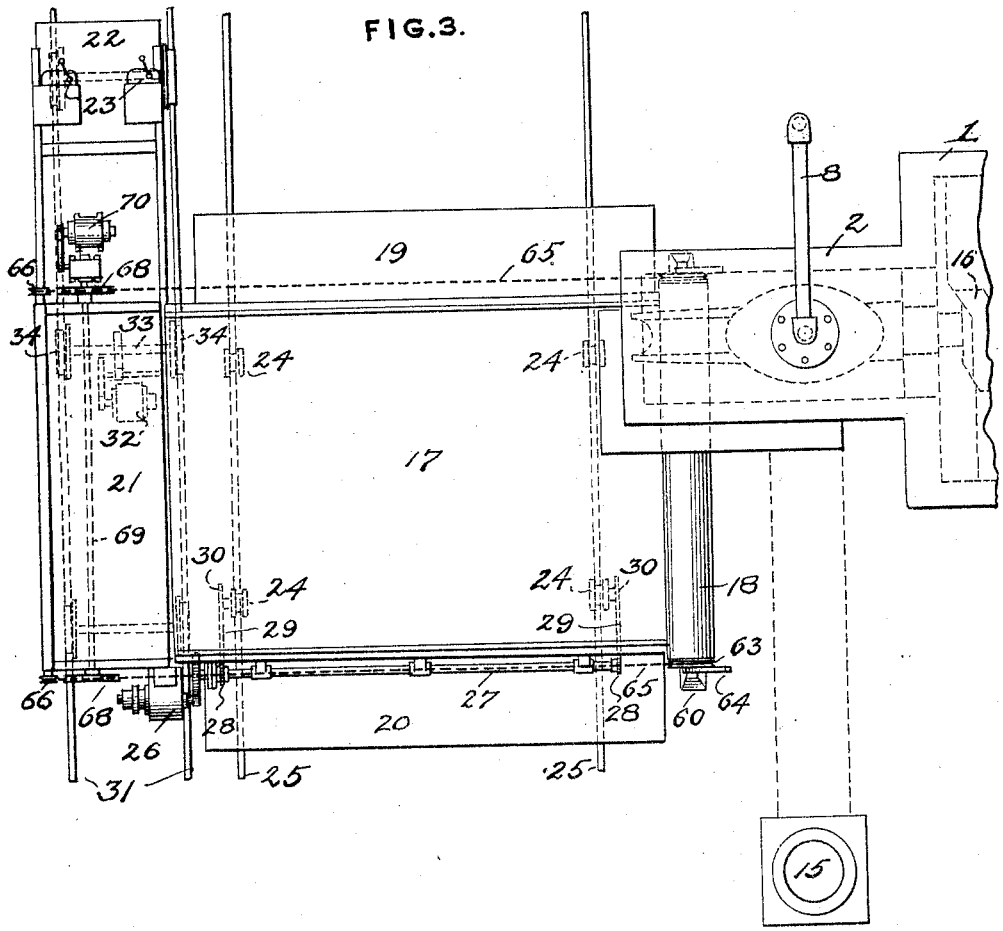
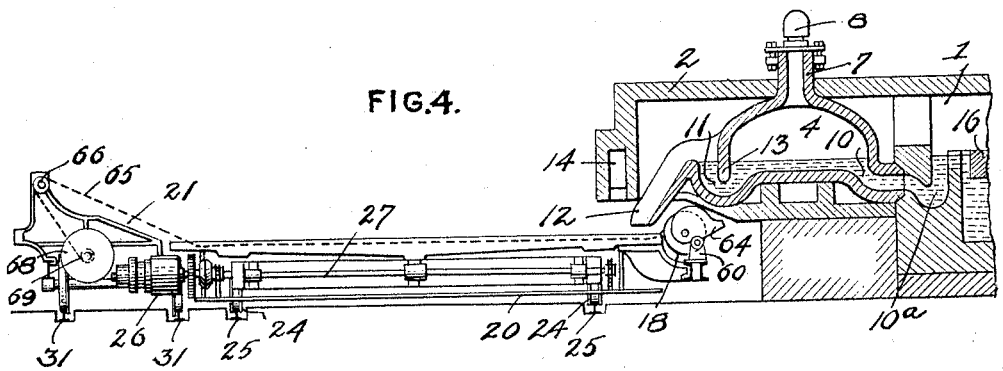

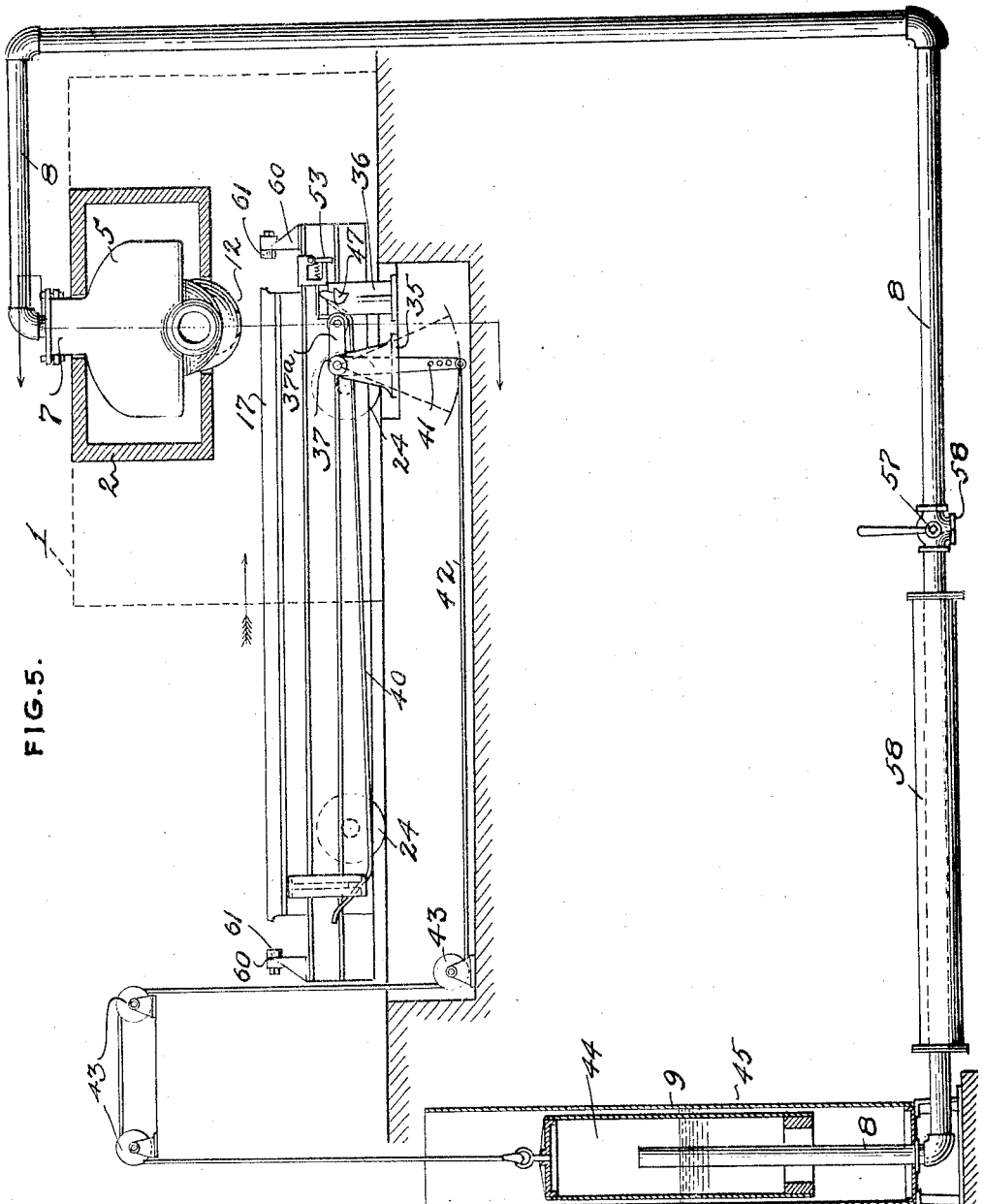

H. K. HITCHCOCK.
APPARATUS FOR THE MANUFACTURE OF PLATE GLASS.
APPLICATION FILED SEPT. 26, 1913. RENEWED FEB. 4, 1918.
1,307,357.
Patented June 24, 1919.
5 SHEETS—SHEET 4.
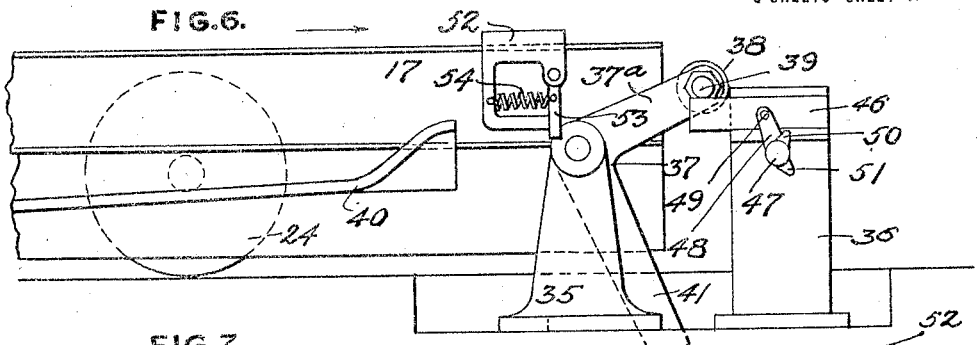
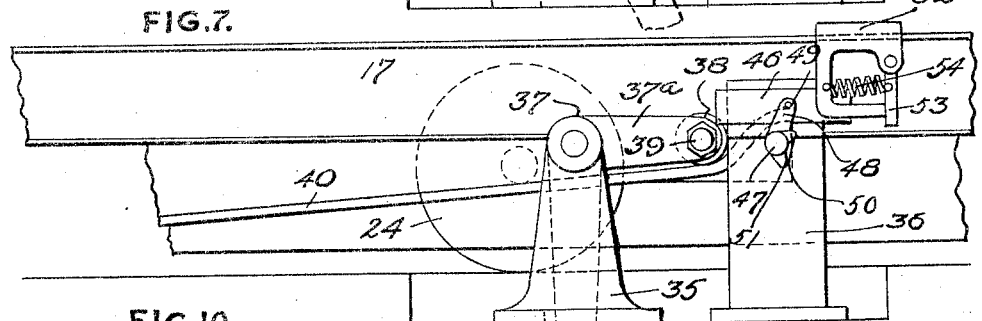
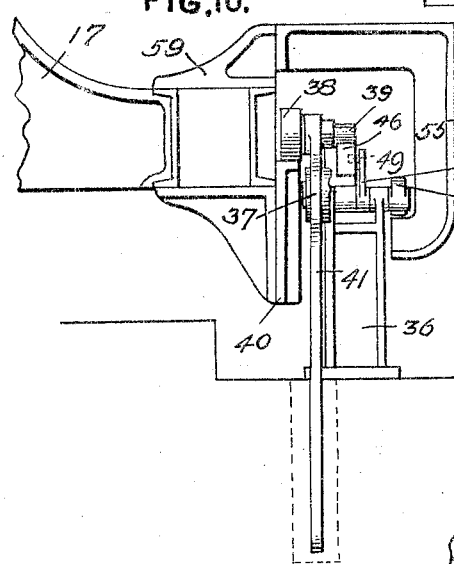
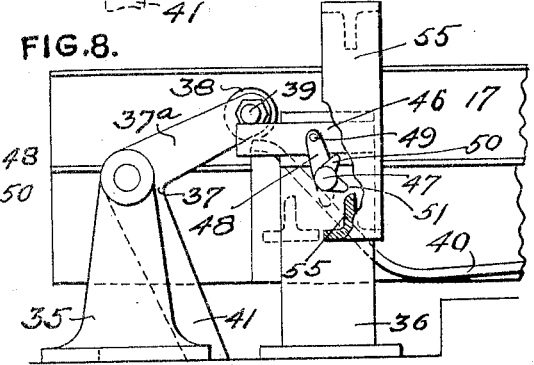
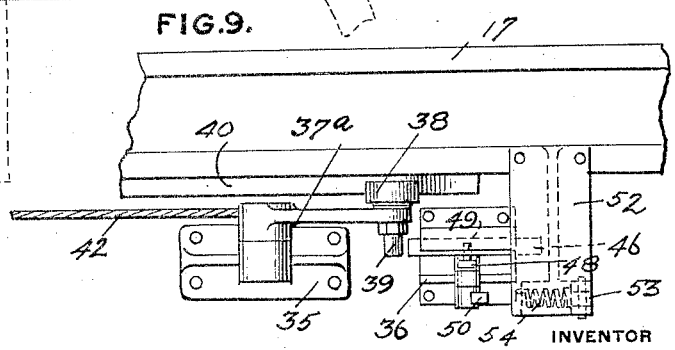

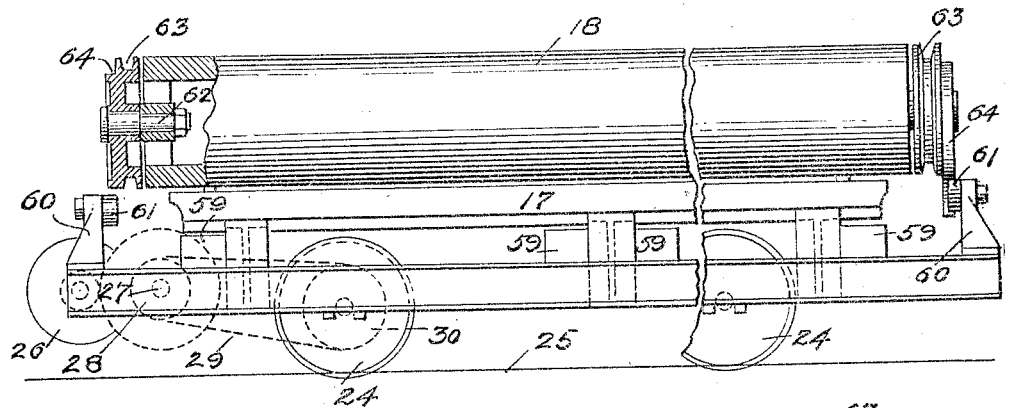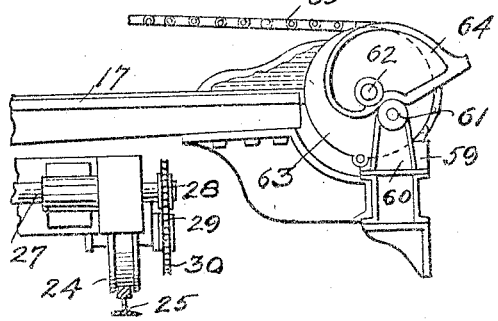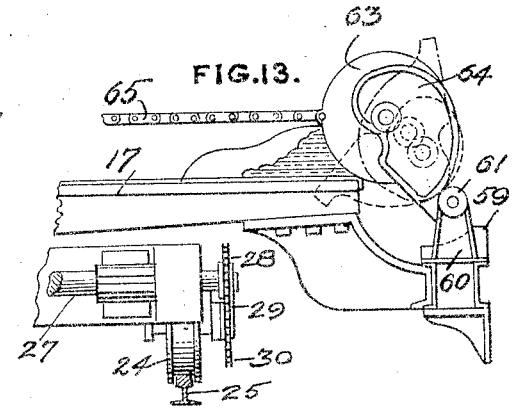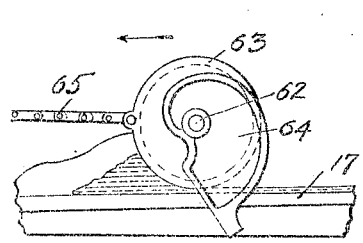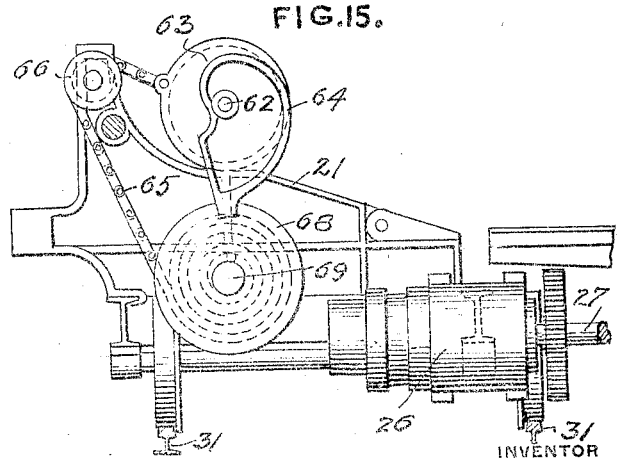

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

APPARATUS FOR THE MANUFACTURE OF PLATE-GLASS.

1,307,357.   Specification of Letters Patent.   Patented June 24, 1919.

Application filed September 26, 1913, Serial No. 792,011. Renewed February 4, 1918. Serial No. 215,397.

*To all whom it may concern:*

Be it known that I, HALBERT K. HITCHCOCK, residing at Pittsburgh, in the county of Allegheny and State of Pennsylvania, a citizen of the United States, have invented or discovered certain new and useful Improvements in Apparatus for the Manufacture of Plate-Glass, of which improvements the following is a specification.

In order to make a satisfactory sheet of plate glass, it is necessary that the glass itself shall be uniform in respect of its index of refraction, since when the sheet is ground and polished, any material variation in the index of refraction of the glass making up the sheet will cause a distortion of the objects viewed through it.

In order to obtain the necessary uniformity in the index of refraction, it is essential that the glass shall be subjected to a very high heat, so that it shall become very liquid, since when it is in this condition the tendency is the greatest for it to become uniform in chemical and physical composition.

Heretofore glass to be rolled into plate glass which is subsequently to be polished, has been made in pots, into which a given batch is introduced and brought to a very high heat, thus causing the contents of the pot to boil and to agitate the mixture so as to obtain a homogeneous product. Other means have also been employed for effectively stirring the glass in the pot. When the glass is in proper condition it is poured directly from the pot upon the casting table.

This operation not only involves much labor and expense, but there has always been difficulty in obtaining pots which shall be, first, sufficiently refractory to withstand the high temperature of the furnace in which they are heated; second, of a strength sufficient to withstand the pressure of the liquid glass contained in them; and third, of such composition as to resist the fluxing action of the substances used in making the glass, so that small particles of the pot shall not come off and enter the glass, which in some cases injures the quality of the glass itself.

In the well known Siemens tank-furnace it is possible to obtain a very high heat, thus bringing the glass to a highly fluid condition, and at the same time by the use of modern methods the glass in the refining end of the tank is practically homogeneous. Since the outer walls of the tank furnace are exposed to the atmosphere, it is possible to obtain a much higher temperature in a tank than it is in a furnace wherein the glass is melted in pots, and the pots themselves are subjected to the temperature of the furnace. The glass in the refining end of the tank-furnace is also generally free from seed and bubbles.

It has been attempted to ladle the glass from the tank and pour it upon the casting-table, and there roll it into sheet form. This operation is a very laborious one, and has been used only where the glass is not to be subsequently ground and polished. Where the glass sheet is to be ground and polished, this operation of ladling has not been successful, for the reason, among others, that the ladle chills a portion of the glass, and this chilled glass having an index of refraction different from that of the hotter portion of the glass, when the two are rolled together into a sheet and the sheet is polished, it will have a wave-like appearance which distorts the image seen through it, and it is thus of inferior quality. Ladled glass is also likely to contain bubbles, and to be otherwise of inferior quality.

It is the purpose of the present invention to render practical and economical the use of tank-furnace glass for the manufacture of plate glass. By means of the invention I am enabled to draw successive, and predetermined, quantities of glass of superior and uniform quality directly from the mass in the refining end of the well known tank-furnace, and to discharge the successive, measured quantities in the same order directly upon the surface of a plate glass casting-table without the employment of manual labor, each quantity so delivered being sufficient in amount to form one plate of glass of the desired size.

It is also a feature of the present invention, that the operation of the apparatus by which the glass is caused to flow from the tank to the casting-table is automatically controlled by the movement of the table itself beneath the spout through which the glass is delivered.

Other improvements are also included within the invention, and will be hereinafter described.

I have illustrated an apparatus embodying my invention in its preferred form in the accompanying drawings.

Figure 1:
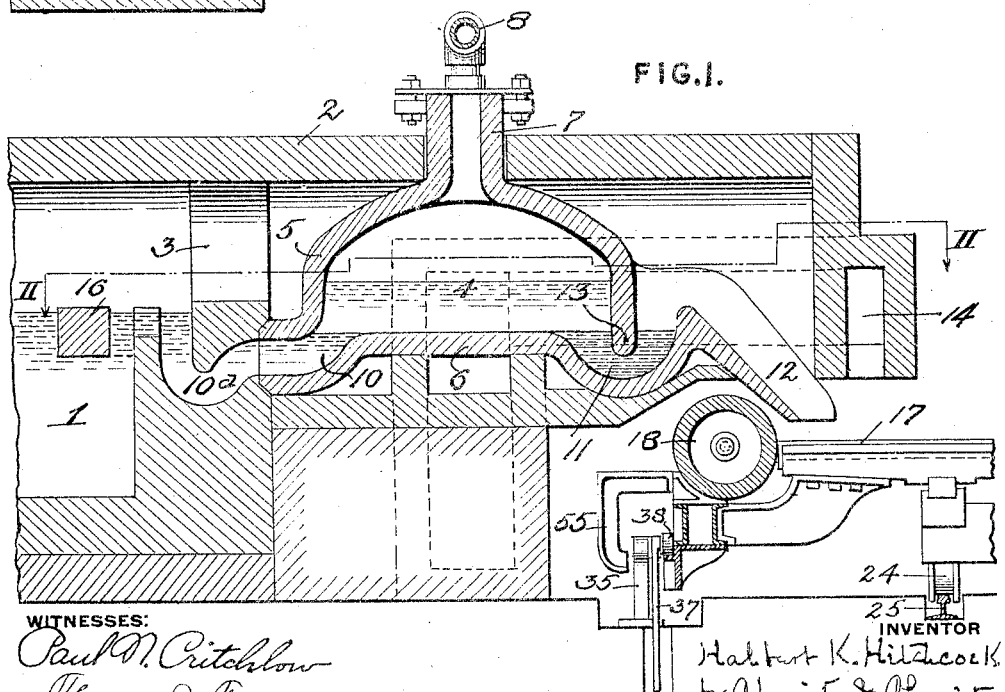

Figure 1 is a vertical, longitudinal section showing the delivery end of a tank-furnace, together with apparatus for delivering the glass therefrom; Fig. 2 is a horizontal section on the line II—II of Fig. 1; Fig. 3 is a plan view of a plate glass casting-table which I prefer to employ, showing also the end of a tank-furnace with a delivery chamber annexed thereto; Fig. 4 is an end elevation of the casting-table, showing the delivery chamber in vertical section; Fig. 5 is a view of the inner side of the casting-table, and showing diagrammatically the mechanism employed for controlling the operation of the glass delivery apparatus; Fig. 6 is an elevation, on an enlarged scale, of the inner side of the forward end of the casting-table in the position which it occupies immediately before the commencement of the discharge of glass thereto; Fig. 7 is a similar view showing the position of the table at the commencement of the glass delivery operation; Fig. 8 is a similar view of the rear end of the table after the finish of the delivery of glass thereto; Fig. 9 is a plan view of that portion of the table shown in Fig. 7; Fig. 10 is an end elevation of the parts shown in Fig. 8; Fig. 11 is a view in elevation of the inside of the table and the roll, certain of the mechanism being omitted; Fig. 12 is an end elevation of the inner side of the table just after the delivery of the glass thereto; Fig. 13 is a similar view showing the operation of raising the roll into position on the table; Fig. 14 is a fragmentary view of the same character illustrating the rolling operation, the trang being omitted in order to show the sheet of glass being formed; Fig. 15 is an end elevation of the auxiliary table with the roll and its associated parts in the position they occupy after the rolling of the sheet.

Referring first to Figs. 1 and 2 of the drawings, the tank-furnace 1, which may be of any well known or suitable construction, is provided with an extension 2 at its delivery end, into which the products of combustion will pass from the body of the furnace through the openings 3, 3, arranged in the inner wall of the extension above the glass level. In the extension is arranged a displacement chamber 4, consisting of a dome-shaped shell 5 resting with its lower edge hermetically sealed upon the floor 6. The shell 5 of the chamber is provided with a hollow neck 7 projecting up through the roof of the extension, where it is connected by the pipe 8 to the pressure regulator 9, Fig. 5. The displacement chamber is preferably elliptical in cross-section, for a purpose to be presently mentioned, and in the floor 6 at its opposite ends are formed gutters 10 and 11. The inner gutter 10 communicates with a passageway 10ª leading from the tank through the inner wall of the extension below the level of the glass, and the edge of the shell 5 above the gutter is in sealing contact with the said inner wall. The outer gutter 11 passes under the edge of the shell 5 and upwardly, where it joins or is formed integrally with the spout 12. The edge 13 of the shell 5 at the gutter 11 is projected downwardly into the gutter for a purpose which will presently appear.

As will hereinafter appear, the plate glass casting-table is arranged to be moved on tracks with its inner edge passing beneath the spout 12, the lip of which is arranged as close to the surface of the table as possible, in order to deposit the molten glass evenly along the edge of the table as the table passes beneath it. After the table has passed by, any suitable box-like structure can be applied to inclose the lip of the spout and the flue 14, so that the products of combustion coming from the body of the tank will pass through this flue and thence to the stack-flue 15.

I have shown a float-valve 16 of refractory material arranged to close the opening from the body of the tank into the passageway 10ª, but it will be understood that this valve will stand open during the operations hereinafter described in order to allow the glass to flow from the tank into the displacement chamber.

In the operation of the apparatus thus far described it will be assumed that, by means to be presently explained, the glass in the displacement chamber 4 has practically all been forced out, and the glass in the outlet 11 as well as in the inlet 10 will be at approximately the level of the floor 6. By means of the pressure regulator 9, to be hereinafter described, air is then exhausted from the displacement chamber through the pipe 8, in order to draw into the chamber the desired quantity of glass. The vacuum so formed causes the glass in the outlet 11 outside the depending edge 13 to fall slightly but the vacuum is so regulated that the level of this glass will not fall below the edge 13, and the glass is thus drawn from the tank through the inlet 10 until it reaches the desired level in the displacement chamber, the vacuum being so regulated as to draw in a predetermined quantity, which will be sufficient, when the glass is discharged from the furnace, to form a sheet of plate glass of the desired size. Then when it is desired to discharge the glass, air under pressure is admitted through the pipe 8, thus forcing the glass out of the spout 12 and upon the surface of the table, which is moved along beneath it. A small quantity of the glass in the displacement chamber 4 will of course be forced back into the inlet 10, but since the passageway for the glass from the body of the tank into the chamber presents a considerably greater resistance to the flow of the glass than does the outlet 11, the greater bulk of the glass in the displacement chamber will pass out of the spout. The vacuum operating to draw the glass into the displacement chamber is accurately regulated, in accordance with rules well known in the art, to satisfy all the necessary conditions, and to store in the displacement chamber at each operation exactly the required quantity of glass. After practically all the glass has been forced out from the displacement chamber, the above described operation is repeated.

It will be noted that at each operation practically all the glass discharged will be glass which is fresh from the tank and from the inlet passage 10, but at the commencement of each discharge the glass first discharged will be the small quantity which has been left in the outlet opening 11 from the previous operation. This small quantity is discharged right at the front of the edge of the table, and will ultimately lie along the front transverse edge of the sheet when rolled. If this small quantity causes any defect in the sheet, this edge may be cut off with very little loss. Or, if it should be desired, a small crucible may be mounted at the front of the table at its inner edge, to catch this initial small quantity of glass, which can then be recharged into the body of the furnace.

The displacement chamber 4 is preferably made elliptical in cross-section, in order that the particles of glass may have as nearly as possible a straight line of flow from the tank to the table, without the formation of eddies in the displacement chamber, and thus the particles composing each mass of glass discharged will be maintained as far as possible in the same relative order of flow.

Referring to Figs. 3 and 4, the casting-table proper is indicated by the numeral 17. At its inner edge is shown the sheet-forming roll 18, the operation of which will be hereafter described. At the opposite ends of the table are placed the steps 19 and 20, and at its outer edge is arranged a supplemental table 21 having an inclined upper surface, as shown in Fig. 15. The supplemental table 21 has a forward plane surfaced extension 22, upon which the operator can stand and by means of the controllers 23 control the operation of the motors and the apparatus as a whole. The table 17 is provided with wheels 24 which run on tracks 25, and the table is caused to move along the tracks by means of the motor 26 geared to the shaft 27, which carries sprocket wheels 28 connected by chains 29 with sprocket wheels 30 on the axles of the two rear wheels 24. Table 21 is moved along the tracks 31, parallel to the tracks 25, by means of the motor 32, (shown on dotted lines), which is geared to the axle 33 of the forward wheels 34 of this table.

Adjacent to the inner side of the table 17 at its forward end when in starting position, are fixed a pair of posts 35 and 36. Pivoted to the post 35 is a bell-crank lever 37, one arm $37^a$ of which carries a roller 38 and an outwardly projecting pin 39. The roller 38 during the movement of the table bears upon the cam-track 40. The other depending arm 41 of the bell-crank lever 37 is connected, as for instance by the cable 42 passing over pulleys 43, to the movable member of a suitable pressure regulator. The pressure regulator 9 herein shown is of a well known type, consisting of a weighted open-bottom and closed-top cylinder 44, having its lower end immersed in water contained in the inclosing open-top cylindrical body 45. The fluid pressure pipe 8 opens into the closed space in the inner cylinder above the body of water and leads thence to the neck 7 of the displacement chamber 4 in the furnace. It will thus be seen that with the arm $37^a$ of the bell-crank lever 37 in elevated position, the other arm 41 will be thrown to the right of its position as shown in Fig. 5, thereby raising the movable member 44 of the pressure regulator 9 and exhausting air from the displacement chamber 4 above the surface of the glass. On the reversal of this position of the bell-crank lever 37 to the position shown in Fig. 5, the movable member 44 of the pressure regulator 9 is permitted to fall, thereby applying fluid pressure in the displacement chamber.

In the top of the post 36 there is mounted a sliding bar 46. Adjacent thereto is a shaft 47, provided with an arm 48, connected to the sliding bar 46 by a pin 49. Fixed to this shaft are a pair of dogs 50 and 51 in angular relation, adapted when struck by the members hereinafter mentioned to rock the shaft, and hence move the sliding bar to one position or the other. Referring to Fig. 6, there is mounted on the inner side of the forward end of the table 17, immediately in front of the forward end of the cam 40, a bracket 52 extending out from the side of the table and provided with a depending pivoted finger 53 standing in line with the upper dog 50. This finger is held back against an arm depending from the bracket by means of the spring 54. In the position of the parts shown on Fig. 6 the pin 39 of the lever arm $37^a$ is shown as resting upon the end of the sliding bar 46, thus denoting a condition of vacuum in the displacement chamber 4. On the initial forward movement of the table 17, the finger 53 will strike the dog 50, thus turning the shaft 47 and moving the sliding bar 46 out from under the pin 39 of the lever arm $37^a$. Just as this takes place the forward end of cam 40 comes under the roller 38 on the end of this lever-arm, and immediately thereafter the roller 38 rides down the inclined end of cam 40, thus allowing the arm 41 to turn to the position shown in Figs. 5 and 7, permitting the movable member 44 of the pressure regulator 9 to drop, thus relieving the vacuum and applying pressure in the displacement chamber 4. This immediately causes the glass to flow from the spout 12 upon the inner edge of the forward end of the table 17.

In order to speedily empty the displacement chamber in the manner already described, the pressure upon the glass should be increased during the travel of the table, and for that purpose it will be seen the cam-track 40 is inclined downwardly in a gradual slope from the front to the rear of the table, thus allowing the movable member 44 of the pressure regulator 9 to gradually fall still further, thereby increasing the pressure. The rate of movement of the table, the pressure regulator, and the shape of the cam-track 40, are all so related to each other, that when the depressed lower end of the cam-track 40 at the rear end of the table 17 has reached the roller 38 of the arm 37a of the bell-crank lever 37, the amount of glass required to form the plate has been discharged from the spout 12 upon the table 17, and then the roller 38 immediately commences to ride up on the upwardly inclined portion of the cam-track 40, thus throwing the arm 41 to the position shown in Fig. 6, raising the movable member 44 of the pressure regulator 9, cutting off the pressure and the discharge of the glass, and again establishing the vacuum in the displacement chamber 4. At the rear end of the table there is a second bracket 55 having its lower end in position to engage the lower dog 51 of the shaft 47. Just as the roller 38 passes off the end of the cam-track 40, the end of this bracket 55 strikes the dog 51, turning the shaft 47, and throwing the sliding bar 46 under the pin 39 on the end of the arm 37a, as illustrated in Fig. 8, thus retaining the bell-crank lever 37 in the position shown in Figs. 6 and 8, and thereby maintaining the vacuum in the displacement chamber 4 until the table has been returned to its original position and a new operation been commenced as already described. In the return movement of the table, the finger 53 simply flops away as it passes the dog 50, and it is then pulled back by the spring 54 to the position shown in Fig. 6, ready for the commencement of a new operation.

An opening 56 to the atmosphere is provided in the pipe 8, which is closed by the hand valve 57. If at any time it is desired to establish conditions of atmospheric pressure in the fluid pressure line this can be done by merely opening this valve.

A water-jacket 58 is also provided to cool the air in the fluid pressure line, which of course becomes heated by its repeated contact with the hot glass in the displacement chamber 4.

It is important that the mouth of the spout 12 be brought as close as possible to the surface of the table 17, since otherwise it might often happen that the falling glass would entrap quantities of air between it and the table, thus forming bubbles in the finished plate. Also in order to successfully roll a sheet of glass on the table 17, it is very desirable that the glass be teemed against a retaining member which shall give it an approximately straight side, thus forming an even edge on the plate. For these purposes it is preferred that during the discharge of the glass the roll 18, by means of which the plate is to be formed, should be removed from the table 17 and lowered. By so doing the end of the spout 12 can be brought closer to the table surface, and at the same time by holding the roll 18 against the edge of the table with its upper portion projecting above the edge, a satisfactory means is provided for holding the glass as it is teemed to a clean, straight edge. In order to accomplish this result supports or saddles 59 are secured to the inner edge of the table, and the roll 18 is allowed to rest upon these saddles during the teeming operation.

At the opposite ends of the inner edge of the table are mounted a pair of posts 60 provided with rollers 61. Pins 62 are mounted in the opposite ends of the roll, and on each of these pins is rotatably mounted a circular disk 63. On the outer face of each of these disks 63 is secured or formed a cam member 64, each of which upon the initial pull upon the roll, as presently to be explained, coöperates with one of the rollers 61 to elevate the roll and allow it to be pulled up in place on the table. The roll is drawn across the table by means of chains 65 secured one to each of the disks 63, which chains pass across the table over idler wheels 66, as shown in Fig. 15, and are wound in superposed convolutions upon wheels 68. These wheels are both mounted on a shaft 69 driven by motor 70, as shown in Fig. 3.

Fig. 12 shows the position of the roll 18 and one of the disks 63 and cams 64 at the end of the teeming operation, when the apparatus is ready for the formation of the plate. The motor 70 is started, thereby drawing upon the chains 65, and the disks 63 being thereby turned cause the surfaces of the cams 64 to turn about on the rollers 61, thus forcing the roll 18 upwardly until the position of Fig. 13 is reached, when the pull of the chains being now in the direct plane of the axis of the roll and the pins upon which the disks are mounted, the roll is drawn across the table as illustrated in Fig.

14, and the cams hang over the edge of the table in the position there shown. As the roll reaches the opposite end of the table, it is drawn upwardly on the inclined surface of the auxiliary table 21, as shown in Fig. 15.

From the above description the operation of the entire machine will be clear. Starting in the position shown in Fig. 3, the table 17 is moved along the tracks 25 past the spout 12, thus by its own movement causing the glass to be deposited evenly along its inner edge and against the upper surface of the roll 18 lying in the saddles 59. After the glass has been teemed and the table has passed from under the spout, the roll 18 is operated and drawn across the table, thus forming the glass sheet. When the roll 18 has passed up on the inclined surface of the auxiliary table 21, the table 17 by continued movement may be brought in front of the leer and the sheet removed. Then by reverse operation of the motor 70 the roll 18 is allowed to roll down the inclined surface of the table 21, upon the table 17, whence it can be moved back to its starting position. The movement of the table 17 is then reversed to starting position, and the operation repeated.

It will of course be understood that the apparatus herein described may be widely varied by those skilled in the art, without departure from the substance of the invention.

No claim is made herein to the new method or process of manufacturing plate glass which the apparatus herein described is adapted to practice and carry out since that will be made the subject of a separate application for Letters Patent.

I claim as my invention:

1. In apparatus for the manufacture of glass sheets or plates, the combination with a receptacle for molten glass provided with an outlet, and means for forming a sheet of glass, of means for discharging molten glass from the outlet, means for moving the sheet-forming means in a line adjacent to the outlet, and means operated by the movement of the sheet-forming means for controlling the operation of the glass-discharging means.

2. In apparatus for the manufacture of glass sheets or plates, the combination with a receptacle for molten glass provided with an outlet, and means for forming a sheet of glass, of means for discharging molten glass from the outlet, means for moving the sheet-forming means into position to receive the glass from the outlet, and means operated by the movement of the sheet-forming means for operating the glass-discharging means.

3. In apparatus for the manufacture of glass sheets or plates, the combination with a displacement chamber for molten glass provided with an outlet, and means for forming a sheet of glass, of means for applying pressure to the glass in the displacement chamber and thereby discharging it from the outlet, means for moving the sheet-forming means into position to receive the glass from the outlet, and means operated by the movement of the sheet-forming means for operating the pressure-applying means and for gradually increasing the pressure upon the glass in the displacement chamber.

4. In apparatus for the manufacture of plate glass, the combination with a tank furnace and a casting table, of a displacement chamber connected to the tank and provided with an outlet, means for alternately drawing molten glass from the tank into the displacement chamber and discharging it therefrom through said outlet, means for moving the table in a line beneath the outlet, and means operated by the movement of the table for operating said glass-drawing and discharging means.

5. In apparatus for the manufacture of plate glass, the combination with a receptacle for molten glass, a displacement chamber having a discharge-outlet, and a passageway for the glass leading from said receptacle to said chamber, of a fluid-pressure regulator, a conduit leading from said regulator to said chamber, a casting-table and means for moving the table into and out of position to receive molten glass from said discharge-outlet, and means connected to said regulator, and arranged in operative relation with the table, and adapted to be operated by the movement of the table for controlling the operation of the regulator.

6. In apparatus for the manufacture of plate glass, the combination with a table, a roll, and means for operating the roll upon the table, of means carried by the table and adapted to support the roll in a position adjacent to and in part below the edge of the table, and means carried by the roll-operating means for elevating the roll from said supporting means and causing it to bear upon the surface of the table.

In testimony whereof I have hereunto set my hand.

HALBERT K. HITCHCOCK.

Witnesses:
 HORACE BARNES,
 E. PETERSON.